March 24, 1936.   E. W. O'MALLEY   2,034,829
METHOD OF PRODUCING VALVE SEATS
Filed Oct. 31, 1932

Inventor
Edward W. O'Malley
By
Atty.

Patented Mar. 24, 1936

2,034,829

UNITED STATES PATENT OFFICE 2,034,829

METHOD OF PRODUCING VALVE SEATS

Edward W. O'Malley, Chicago, Ill., assignor of one-third to Edward O'Malley and one-third to James G. McNeil, Chicago, Ill.

Application October 31, 1932, Serial No. 640,452

1 Claim. (Cl. 29—157.1)

This invention relates to improvements in a method of making valve seats, particularly fitted for that type of valve which is provided with a removable seat supporting member.

While it is recognized that valve casings have been provided with seats having a seating surface of a metal more resistant to wear than the metal forming the casing, yet to date such seats in commercial valves have been limited to material which may be readily tooled and screw threaded for engagement with corresponding threads in the diaphragm of the commercial valves. It is an object of this invention to provide a valve seat of a material of such extreme hardness that it is practically indestructible and will not be affected by the usual causes which during use effect deterioration of the commercial valve seats. It is a further object of this invention to provide means for supporting this improved seat in position and also be adapted for ready replacement as a substitute for the removable seats of commercial valves.

With these and other objects in view, reference is made to the accompanying sheet of drawing which illustrates a preferred form of this invention with the understanding that detail changes may be made without departing from the scope thereof.

In the drawing—

Figure 1:
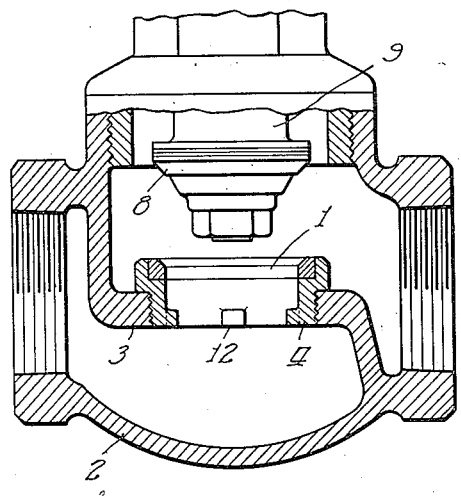
Figure 1 is a view partly in central vertical section and partly in side elevation of a commercial globe valve, with parts broken away, illustrating an application of this invention.

It is essential in many arts, such as the railroad art, that the valves employed therein be positive in their closing action. Such valves are not only expensive in themselves, but the removal of a deteriorated valve for replacement not only causes delay, but is an expensive proceeding. As the contact parts of valves deteriorate when continuously used removable valve heads and valve seats were developed, whereby these parts could be readily replaced without removing the valve casing from its connections. In practice, it has been found that in making such replacements, the tendency has been to replace only the valve head or valve head contacting surface, allowing the deteriorated seat to remain.

This invention contemplates the application of a metal so hard and tough that it will resist the wear of constant usage as a valve seat as long as the valve casing which contains it remains operative. It has been found that cold drawn nickel possesses the desired qualities for such a seat, however, the very hardness and toughness of the metal prevents its commercial working into the commercial form of removable valve seat supporting members. This invention contemplates the formation of a nickel valve seat in the form of an insert ring mounted and held in a seat ring as disclosed upon the drawing.

The insert ring 1 is manufactured by cold drawing nickel tubes to correct size inside and out for the particular type of valve for which it is designed, the cold drawn tube is then sawed into rings approximately the length required for each single seat.

Commercial globe valves, such as illustrated in Figure 1, are manually formed with a brass valve casing 2 having cast therein an integral diaphragm 3 provided with a circular opening concentric with the axis of the valve stem and screw-threaded to receive a brass seat supporting member or ring 4. In accordance with this invention, the brass seat ring 4 is cut out at its upper side to form a shoulder 5 upon which the insert ring 1 is adapted to rest with perpendicular concentric walls 6 of such a diameter as to snugly receive the insert 1 and preferably of sufficient height to extend above the top of such ring when it is seated upon the shoulder 5.

Figure 2:
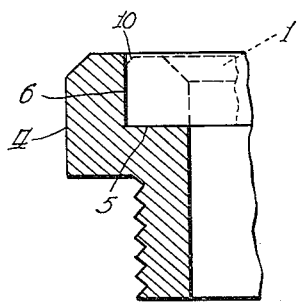
Figure 2 is an enlarged fragmentary detail view of a preferred seat ring or support, indicating in dotted lines the position finally assumed by the seat, before the seat is secured thereto.
Figure 3:
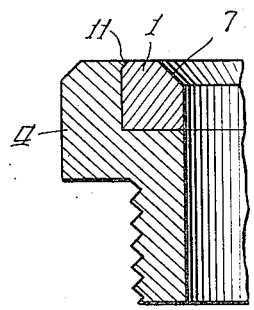
Figure 3 is a similar view illustrating the seat in position and the manner in which it is held permanently upon its support.

The inner periphery of the nickel insert ring 1 is readily ground to the desired diameter and usually forms the continuation of the inner walls of the seat ring 4. At the same time the contacting surface 7 of the nickel insert ring is ground to the proper angle for contact with the plug or contacting surface 8 of the valve head 9 and the outer upper edge of the ring is chamfered, as shown at 10 in Figure 2. The insert ring 1 is then forced into the seat ring 4 and, as shown in Figure 2, the outer wall of the brass seat ring 4 extends slightly above the upper surface of the insert ring 1. The brass seat ring is then machined down on the top surface forming a lip 11 at the edge of the brass seat ring that is rolled over by a rolling tool to engage the chamfered outer edge of the insert ring, as shown in Figure 3, and, if desired, the upper surfaces of the seat and insert rings may be ground to lie in the same plane. The brass seat ring 4 is screw-threaded to be readily inserted and removed from the screw-threaded diaphragm 3 by providing lugs 12 for engagement with a tool.

In this manner cold drawn nickel insert rings may be readily applied to brass seat rings of any size or dimension which may be initially inserted in commercial valves or be readily substituted as a replacement for valves having removable seats. The very character of cold drawn nickel prevents it being screw-threaded in the form of a replaceable seat ring, such as the seat ring 4, illustrated in Figure 1. It has been found that the construction of the cold drawn nickel insert ring mounted in the particular manner illustrated in Figure 3 upon the brass seat ring 4 provides a valve seat which may be ground to the desired angle to coact with any desired plug or valve head, forming a seat which is practically indestructible and will be wear resisting to all causes encountered in use which would ordinarily cause deterioration of a valve seat. The advantages of such a valve seat are obvious and, in the form shown, may be initially furnished with the valve casing or applied as a replacement for the valve seat customarily supplied with the valve casing.

I claim:

The method of producing valve seats of such extreme hardness as to prevent tooling and screw threading comprising cold drawing nickel tube, cutting a nickel ring from the tube, chamfering the upper outer edge thereof, casting a seat of softer metal with a ring receiving recess of less diameter and greater depth than the nickel ring, forcing the nickel ring into said recess, machining down the top of the seat ring to form a lip adjacent the nickel ring, rolling the lip over to engage the chamfered edge of said ring and grinding the upper surfaces of the seat and ring to lie in the same plane.

EDWARD W. O'MALLEY.